(12) United States Patent
Koay

(10) Patent No.: US 7,058,024 B1
(45) Date of Patent: Jun. 6, 2006

(54) AUTOMATIC TELECOMMUNICATIONS LINK IDENTIFICATION SYSTEM

(75) Inventor: Helena G. Koay, Windham, NH (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/243,269

(22) Filed: Feb. 3, 1999

(51) Int. Cl.
*H04L 12/28* (2006.01)

(52) U.S. Cl. ...................................... 370/255; 370/351
(58) Field of Classification Search ................ 370/254, 370/255, 256, 257, 258, 351, 401, 402, 403
See application file for complete search history.

(56) References Cited

U.S. PATENT DOCUMENTS

| | | | | |
|---|---|---|---|---|
| 4,644,532 A | * | 2/1987 | George et al. | 370/255 |
| 5,319,644 A | * | 6/1994 | Liang | 340/2.1 |
| 5,465,251 A | * | 11/1995 | Judd et al. | 340/2.1 |
| 5,506,838 A | * | 4/1996 | Flanagan | 370/258 |
| 5,590,117 A | * | 12/1996 | Iida et al. | 370/248 |
| 5,732,086 A | * | 3/1998 | Liang et al. | 370/410 |
| 5,815,490 A | * | 9/1998 | Lu | 370/223 |
| 5,832,196 A | * | 11/1998 | Croslin et al. | 370/218 |
| 5,909,175 A | * | 6/1999 | Yamasaki et al. | 340/506 |
| 5,920,267 A | * | 7/1999 | Tattersall et al. | 340/825.52 |
| 5,982,783 A | * | 11/1999 | Frey et al. | 370/395.6 |
| 6,154,462 A | * | 11/2000 | Coden | 370/258 |
| 6,373,826 B1 | * | 4/2002 | Russell et al. | 370/256 |

FOREIGN PATENT DOCUMENTS

| | | |
|---|---|---|
| EP | 0 221 360 A2 * | 5/1987 |
| EP | 0 773 649 A2 * | 5/1997 |
| EP | 00 30 0566 | 2/2005 |
| WO | WO 97/31458 | 8/1997 |

OTHER PUBLICATIONS

Coan, Brian A. et al., Using distributed topology update and preplanned configurations to achieve trunk network survivability, Reliability, IEEE Transactions on, vol.: 40 Issue: 4, Oct. 1991, pp. 404–416, 427.*

Yasuda Y et al: "Automated Network Connection Tracing and data Gathering Methods in the SDH Network" IEEE Transactions on Communications, IEEE Inc. New York, US, vol. 42, No. 2/3/4, Feb. 1, 1994, pp. 1065–1075, XP000447371 ISSN: 0090-6778.

* cited by examiner

*Primary Examiner*—Chi Pham
*Assistant Examiner*—Keith M. George

(57) ABSTRACT

A telecommunications network in accordance with the principles of the invention includes one or more controllers that automatically determine the physical interconnectivity between at least two ports adjacently situated in different network elements. Each end-point, that is, each port, has a unique identification. In an illustrative embodiment, upon the occasion of a network modification, such as the addition of a port to the network, the initiation of a port, or reconfiguration of a link, the two ports attached to a communications path to form a link exchange their "view" of the link. That is, each port sends an identification message to the other port. Each of these messages includes the identification of the sending port and the presumed identification of the receiving port. If at first the ports don't agree, the receiving port updates its view of the link. This process is repeated until both ports agree on the identification of each port within the link.

27 Claims, 12 Drawing Sheets

AUTOMATIC TELECOMMUNICATIONS LINK IDENTIFICATION SYSTEM

FIELD OF THE INVENTION

The invention relates to telecommunications networks and, more particularly, to the identification of point-to-point links within a telecommunications system.

BACKGROUND OF THE INVENTION

Just as every journey of a thousand miles begins with a single step, every telecommunications network begins with a single link. Each link connects two telecommunications network elements, from individual port to individual port, through a specific transmission medium, such as an electrical cable, an optical fiber, a radio frequency (RF) channel, or other transmission medium. Each network element may be linked to one or more other network elements through a plurality of ports, each of which may include an electrical, optical, or RF interface. In order to properly allocate, or "provision", network resources and to react appropriately to alarm conditions, one must have an accurate "map" of the network, its component links, and their interconnection. Unfortunately, the link information is difficult to obtain, changes all too frequently (through the addition or deletion of ports, for example), and is subject to error in its discovery. That is, conventional telecommunications networks typically rely upon technicians to input link information, port-to-port connectivity information, whenever a network element is connected to another network element (from one port to another), whenever a network element, or a port on the network element, is initiated, or whenever the port-to-port connectivity of the network is modified in any other way. Not only is the manual entry of such link information time consuming, the tedium involved with such an enterprise very often elicits mistakes from the operating technician.

To properly manage a telecommunications network, a telecommunications network management system typically must be able to identify each link within the system. That is, the network management system typically accumulates the point-to-point connectivity information between the various ports within the system to form a network map. The network map portrays the "cabling", whether optical, electrical, or otherwise, between all the ports within all network elements within the system. Such networks typically include a very large number of network elements, an even larger number of ports, and, as noted above, in conventional telecommunications networks, each of the links is identified manually. The process of identifying each of the network elements could be a daunting task. That is, due to the tedium involved, and the consequent propensity for errors, manually identifying the port-to-port cabling, or link identification, or all the links connecting all the network elements entails such a great deal of effort as to make it practically impossible. Not only must the link identification information be provided to a network manager and to each of the network elements at the time of a system's initiation, with the addition or deletion of a network element, or a port associated therewith, the link identification information within each element in the network, and/or within a network manager, must also be manually updated. Such an approach is not only error-prone, but time consuming and, consequently, expensive. Since it is impracticable for technicians to input and provision the cabling in this manner, a network manager cannot not ascertain the identification and create a map of connectivity between all the ports within the network manager's domain. A network management system that automatically determines the connectivity path for each link under its purview would therefore be highly desirable.

SUMMARY

A telecommunications network in accordance with the principles of the invention includes one or more controllers that automatically determine the physical interconnectivity between at least two ports adjacently situated in different network elements. Each end-point, that is, each port, has a unique identification. In an illustrative embodiment, upon the occasion of a network modification, such as the addition of a port to the network, the initiation of a port, or reconfiguration of a link, each port's associated controller transmits an identification message to the port's adjacently neighboring port. The identification message includes the transmitting, or local, port's identification and the presumed identification of the adjacent receiving, or remote, port's identification. Similarly, the controller associated with the remote port transmits an identification message containing the "remote port's view", that is, the local and remote port identifications, from the perspective of the remote port, to the local port.

If the identification messages from the two neighboring ports agree, that is, if the remote and local port identifications of each port are reciprocal, the link is identified, in that one or more controllers have determined the interconnectivity of the two ports that comprise the link. The controllers retain this link identification information until some change in the network configuration initiates a re-identification. If, however, the identification messages from the two neighboring ports do not agree, the controller associated with the local port will update the "remote" potion of its identification message and re-send the message to its neighbor as an acknowledgement of the updated remote port identification information. Once the link identification is established, this interconnectivity data is maintained until such time as a neighboring port sends a link identification message, or the port's local identification is modified. This exchange of link information is event-driven, triggered by the creation of a link, by the re-establishment of a link connection with an adjacent network element, or by the modification of a port's identification, the port's associated network element's network address, or symbolic name. In accordance with an illustrative embodiment of the invention, the link identification includes the target identifier and network address of each network element and, consequently, the automatic link identification process may be employed to identify the network elements within a telecommunications network.

Although the invention may employ any of a variety of "cabling media", including wire, optical, or RF, to connect two ports and thereby form a network link, in the illustrative embodiment optical fibers are employed in a telecommunications network that may be compatible with SONET or SDH optical telecommunications systems standards. Additionally, although a telecommunications network in accordance with the principles of the invention may employ any of a variety of topologies, the illustrative embodiment employs a bidirectional line switched ring (BLSR) topology.

In an illustrative embodiment, the "discovery" of link identification, that is, the determination of port-to-port interconnectivity, takes place at the Open Systems Interconnection (OSI) data link layer and employs the link access procedure for ISDN D-channel (LAPD) protocol. The data link layer and other basic concepts of the Open Systems Interconnection (OSI) reference model are discussed in "Open Systems Networking", David M. Piscitello, A. Lyman Chapin, Addison-Wesley Publishing Company, Reading Mass., 1993, pages 33–62, which are hereby incorporated by reference.

A network in accordance with the principles of the invention may employ a network management system to accumulate the above link identification information for each active link in the network, to thereby create a network map. The network management system may be a distributed system, in that each element within the network, employing its own controller, may develop a network map, or network topology. Alternatively, in a telecommunications system that employs a centralized network management system a network management system controller may interrogate various network elements in order to obtain the link information and then to develop the network map. The network map, in turn, may be employed by the network management system to allocate, or provision, network resources and to properly respond to network alarms.

BRIEF DESCRIPTION OF THE DRAWINGS

The above and further features, aspects, and advantages of the invention will be apparent to those skilled in the art from the following detailed description, taken together with the accompanying drawings in which.

DETAILED DESCRIPTION

A telecommunications network in accordance with the principles of the present invention includes one or more controllers that automatically determine the physical interconnectivity between individual ports within the telecommunications network. An identification message, including the identification information related to both the sending and receiving ports, is transmitted from each port to its adjacent neighbor and, when the two ports converge on a view of their interconnectivity, that interconnectivity information is stored for each port within the one or more controllers. By accumulating the interconnectivity information for all the links within the network, a network management system may produce an accurate network map that may be employed for provisioning network resources and for responding to network alarms.

Figure 1:
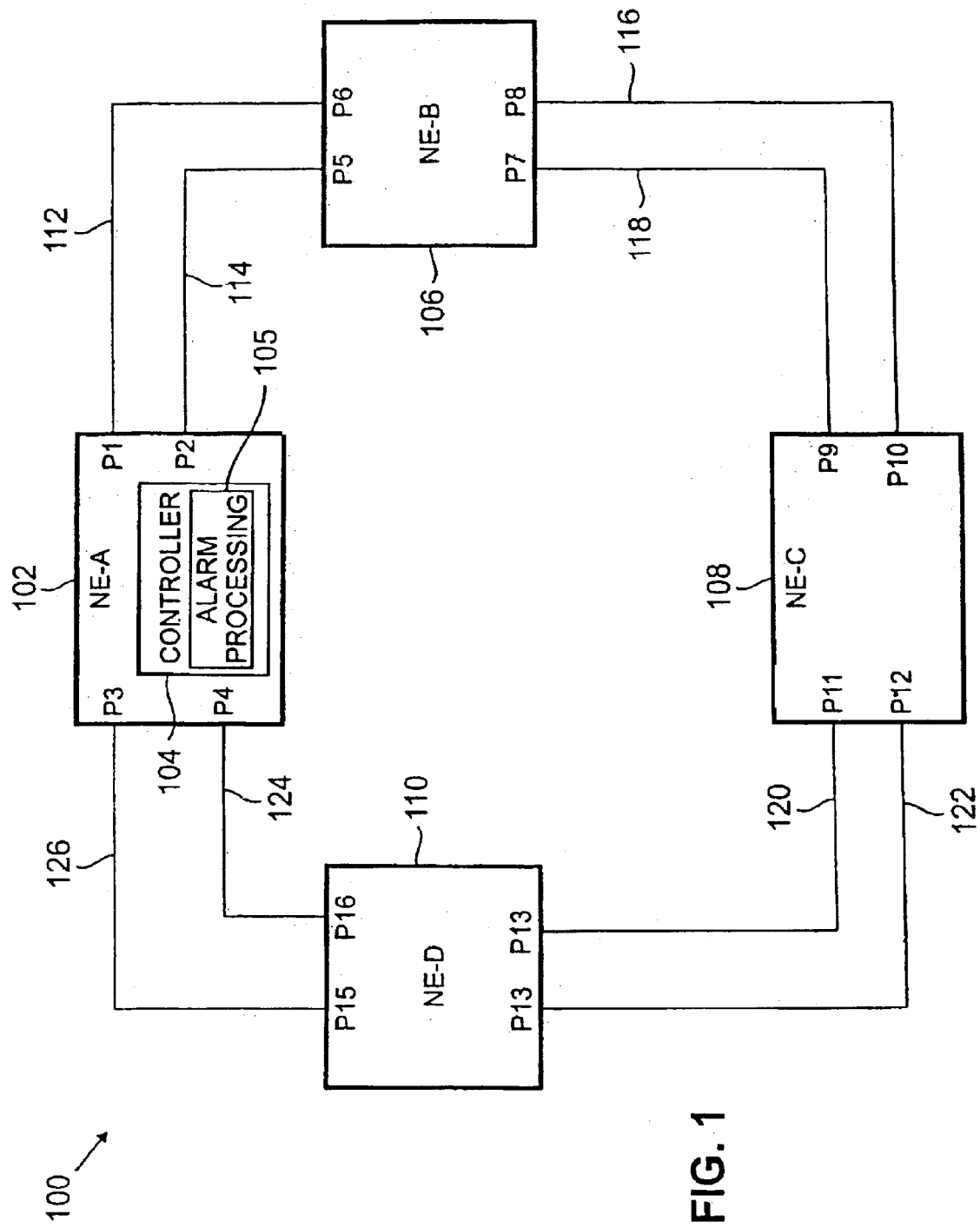
FIG. 1 is a conceptual block diagram of a network which automatically identifies the links which comprise the network, in accordance with the principles of the invention.

The conceptual block diagram of FIG. 1 illustrates a telecommunications network 100 in accordance with the principles of the present invention. The network includes a plurality of network elements (NEs) interconnected through communications links. Each communications link includes a pair of ports and a transmission path through which they are connected. The transmission paths may be embodied by such media as wire cable, optical fiber, or an RF transmission path, but may be referred to hereinafter as a cable or a fiber for the sake of convenience. The term network element, or NE, will generally be used to refer to any one of a variety of telecommunications equipment types, such as a multiplexer, an add/drop multiplexer, a switch, or other piece of telecommunications equipment that may act as a node within a telecommunications network. Each NE typically includes a plurality of ports, each of which may be connected through a path, such as an electrical cable or an optical fiber, for example, to another port within another NE. A network link, essentially, comprises this combination of two ports connected through a communications path. A network may include one or more such network links. Additionally, the network may be viewed as a combination of nodes, each of which may be automatically identified, as described in the provisional United States patent application filed by the same inventor as the current application on Dec. 3, 1998, having Ser. No. of 60/110724, and entitled, "Automatic Node Identification Assignment in Ring Networks", which is hereby incorporated by reference in its entirety.

In the illustrative embodiment of FIG. 1a plurality of network elements (NEs) NE-A, NE-B, NE-C, and NE-D are interconnected to form a network 100. NE-A 102 includes four ports, p1, p2, p3, and p4. Each of the ports p1, p2, p3 and p4 may comprise electrical or optical interface circuitry and data may be transmitted or received through each of the ports. A network link, over which data may be transmitted and received, may be formed by attaching a port within one network element to a port within another network element through a transmission path such as an electrical cable or an optical fiber. A controller 104 is associated with the NE-A 102 and may be physically co-located within the same package as the NE-A 102 or may be located separately, with a communications path provided to the NE-A 102. The controller 104 may take any of a variety of forms, such as an embedded controller, dedicated to the associated network element, or it may be a controller such as a DACScan 2000™ as described in "Understanding SONET/SDH Standards and Applications, Ming-Chwan Chow, pp. 7-1 through 7-40, Andan Publisher, New Jersey, 1995, which is hereby incorporated by reference." As such, in various embodiments of the present invention, the controller 104 may be a general purpose computer that is programmed to perform various control functions, such as an alarm processing system 105 (described in detail below). In accordance with the present invention.

Each network element, NE-B 106, NE-C 108, NE-D 110 may include a controller (not shown), and a plurality of ports. Ports p5–p8, p9–p12, and p13–p16 are respectively contained within network elements NE-B, NE-C, and NE-D. Port p1 of NE-A is connected through transmission path 112 to port p6 of NE-B and port p2 of NE-A is connected through transmission path 114 to port p5 of NE-B. Similarly ports p8 and p7 of NE-B are respectively connected to ports p10 and p9 of NE-C through transmission paths 116 and 118; ports p11 and p12 of NE-C are connected to ports p14 and p13 of NE-D through transmission paths 120 and 122, respectively;

and ports p16 and p15 of NE-D are respectively connected to ports p4 and p3 of NE-A through transmission paths 124 and 126. In a SONET or SDH network embodiment of the network 100, each of the transmission paths 112–126 might be an optical fiber and the illustrated network may be implemented, for example, as a bidirectional line switched ring (BLSR). SONET networks and bidirectional line switched rings are known and are discussed, for example, in "Understanding SONET/SDH Standards and Applications, Ming-Chwan Chow, pp. 7-1 through 7-40.

In accordance with the principles of the present invention, the controller 104, under various circumstances including network modifications such as the addition of a port to the network, the initiation of a port, or the reconfiguration of a link, initiates the transmission of identification messages from each of the ports to the respective ports to which they are connected. The identification message provides an indication of the transmitting port's, "view", "perception", or "presumption" of the link's configuration. The transmitting port's view of the link configuration is compared to the receiving port's view of the link configuration. As will be described in greater detail below, the transmitting and receiving ports exchange their views of the link configuration until their views converge (not withstanding the somewhat anthropomorphic terminology, there is no implication that the ports are, or directly rely upon for their proper operations, sentient beings).

Figure 2:
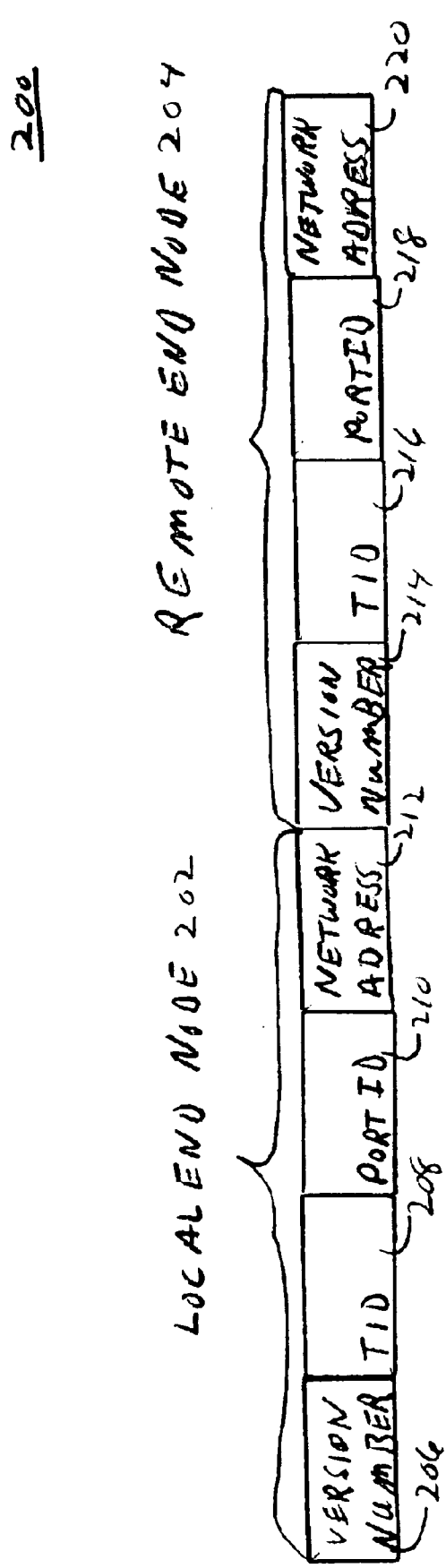
FIG. 2 is a block diagram depicting the contents of a network identification message that may be employed within a network such as that depicted in the block diagram of FIG. 1.

Specifically, in an illustrative embodiment, the identification message include the information set forth in the illustrative conceptual diagram of FIG. 2. In this illustrative embodiment, the transmitting port includes its own port identity and it's best estimate of the receiving port's identity. This estimate may be based upon previously received messages from the receiving port or other sources, or the field may be left "blank". In the illustrative example, the link identification message 200 includes local end node 202 and remote end node 204 information segments. The local end node segment includes a version number 206, a target identifier (TID) 208, a port identifier 210, and a network address 212. The target identifier is the symbolic name of the port's associated network element. Similarly, the remote end node information segment 204 includes a version number 214, the presumed TID 216 associated with the remote port, the presumed port identification 218 of the remote port, and the network address 220 of the remote port's associated network element. As noted above, this exchange of link information is event-driven, triggered by the creation of a link, by the re-establishment of a link connection with an adjacent network element, or by the modification of a port's identification, or the port's associated network element's network address or symbolic name.

Figure 3:
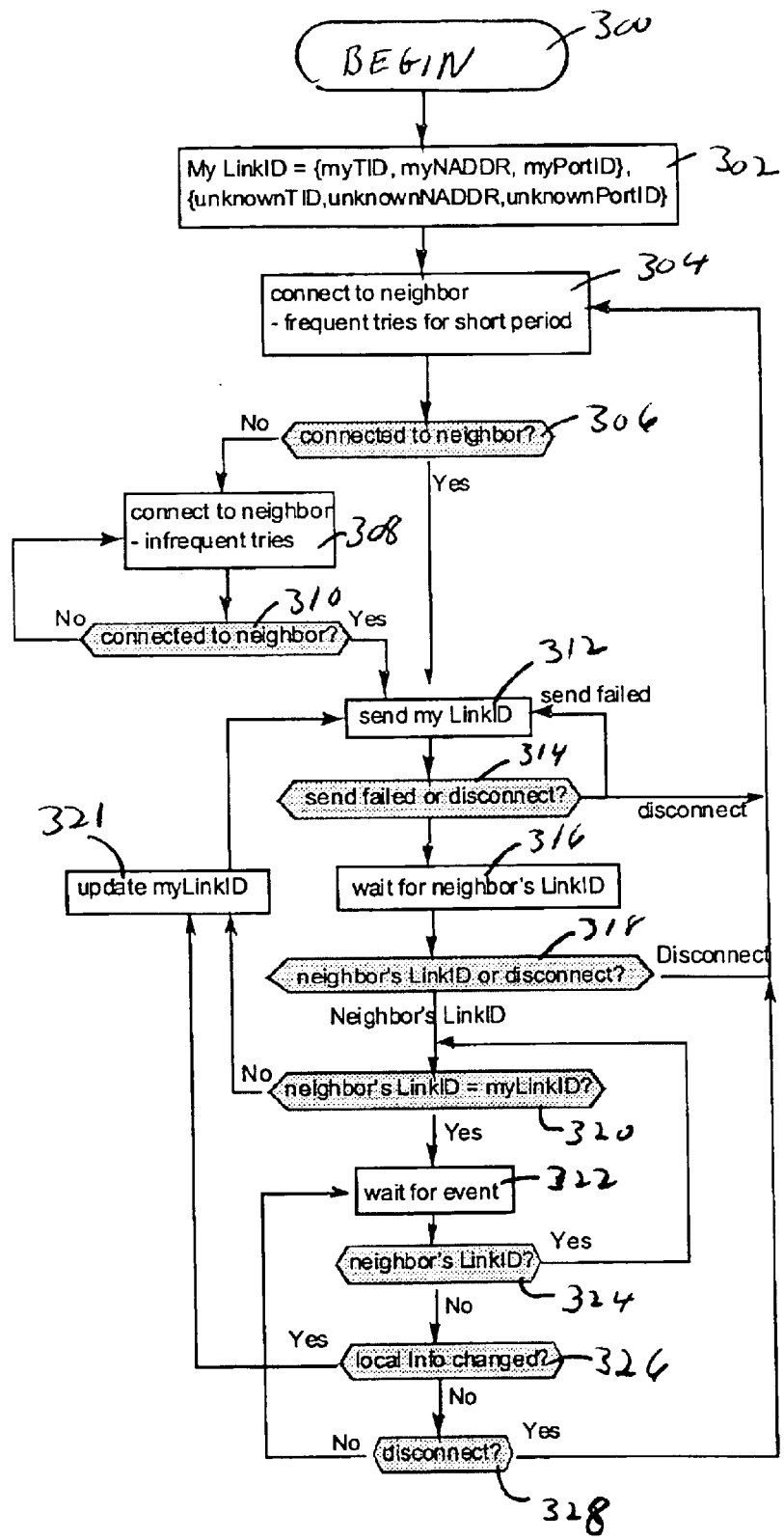
FIG. 3 is a flow chart illustrating the process of automatically identifying the port-to-port connectivity which defines a link within a telecommunications network such as that of FIG. 1.

The basic link identification process is set forth in the flow chart of FIG. 3. The process begins in step 300 and proceeds from there to step 302 where the link identification information, as set forth in the block diagram representation of FIG. 2, is initialized, with the presumed values for the local 202 and remote 204 end node data segments. The remote end node data segment 204 could be initialized to "unknown" values, for example. The process proceeds from step 302 to step 304 where an attempt is made to establish a connection between the local and remote ports. The attempt is repeated frequently until a connection is established or a predetermined period of time has elapsed. In either case, the process proceeds from step 304 to step 306, where it is determined whether the connection to the adjacent port has been established. If the connection has not been made, the process proceeds to step 308, where less frequent attempts to connect to the adjacent port are made. The association may be made at a data link layer and, in an illustrative OSI embodiment, the connection is made through an OSI data link layer employing the LAPD protocol. More specifically, the connection employs the AITS service of the LAPD protocol, which insures reliable communications for this critical step. From step 308 the process proceeds to step 310 where it is determined whether a connection to the adjacent port has been established. If no connection has been made, the process returns to step 208. If the connection has been established the process proceeds, as it would from step 306 when a connection is established, to step 312, where the local port transmits its link identification information, e.g., the link identification message 200, to the remote port.

In step 314 a test is performed to determine whether the transmission to the remote port has failed, has been successful, or the connection has been terminated. If the connection has been terminated, the process returns to step 304, and from there as previously described. If the transmission has failed, the process returns to step 312 to re-send the link identification message. If the transmission was successful, the process proceeds from step 314 to step 316, where the local port awaits the reception of a link identification message from the remote port. From step 316 the process proceeds to step 318 where it is determined whether the remote port's link identification message has arrived or, the connection to the remote port has been terminated. If the connection has been terminated the process proceeds to step 304, and from there as previously described. If it is determined that the remote port's link identification message has been received, the process proceeds to step 320 where the remote and local link identification messages are compared, and, if they are not the same, the process proceeds to step 321, where the local port updates its link identification information. From step 321, the process returns to step 312 and proceeds from there as previously described. On the other hand, if the local and remote link identification messages are the same, the process proceeds from step 320 to step 322.

In step 322 a state is entered whereby the process essentially idles, awaiting an event, such as an update in the remote port's identification, modifications to the local port's identification, or the termination of the connection to the remote port. Other processes may be taking place in parallel at the same time, on the same controller or network management system. When such an event occurs, the process proceeds from step 322 to step 324 where it is determined whether the remote port's link identification message has been received and, if it has, the process returns to step 320 and proceeds from there as previously described. If the remote port's link identification message was not received, the process proceeds from step 324 to step 326 where it is determined whether local port identification information has been changed. If local port identification information has been modified, the process returns to step 321 and from there as previously described. If local identification information has not been updated the process proceeds to step 328, where it is determined whether the link to the remote port has been terminated and, if so, the process returns to step 304 and, from there as previously described. If the link to the remote port has not been terminated the process returns to step 322 and from there as previously described.

Figure 4:
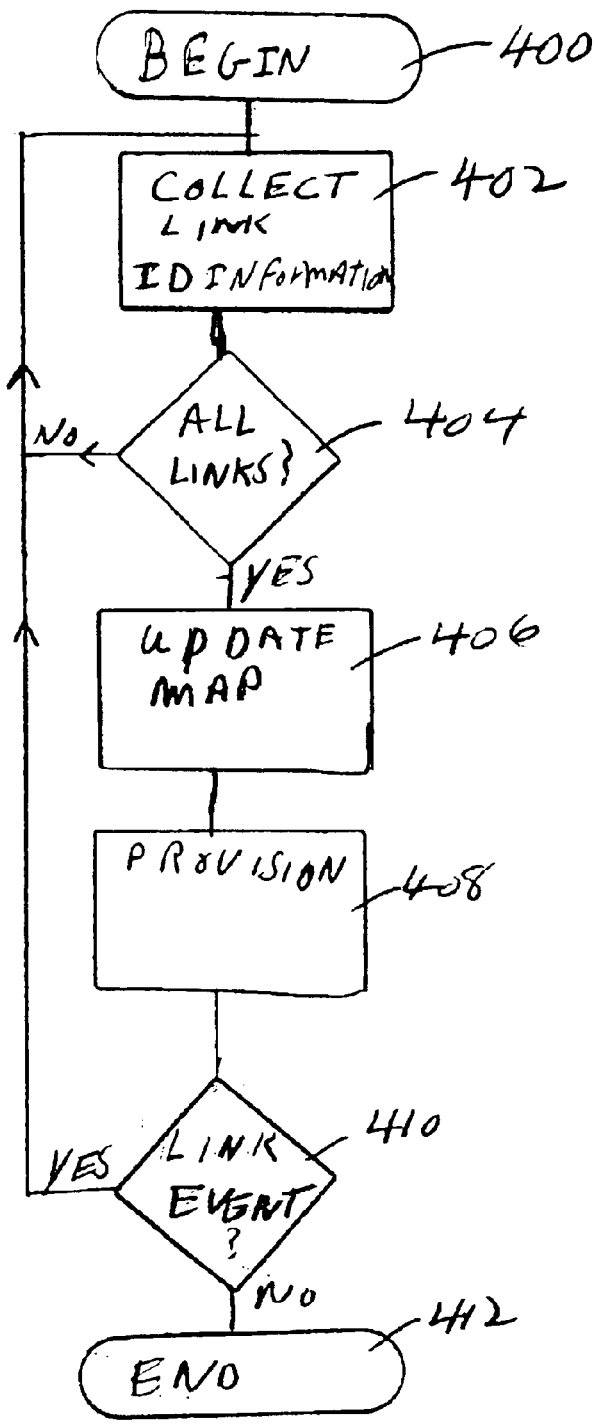
FIG. 4 is a flow chart that illustrates the process of automatically producing a network map from link identification information such as may be obtained in the process depicted in FIG. 3.

Once the link identification has been established in this manner, the link identification information may be employed to form, with a network management system, for example, a network map. The network map could then be used to provision the bandwidth capacity of the various links within the network or to respond to network alarms by correlating network alarms and isolating failures. Additionally, the system could respond by re-routing data around a failed link, for example. The flow chart of FIG. 4 sets illustrates the basic steps involved in creating a network map based upon the link identification information established according to the process described in the discussion related to the flow chart of FIG. 3. Once the map is established, the resources referenced by the map may be allocated and modifications to the link information may be reflected in the map.

The process of producing a network map begins in step 400 and proceeds from there to step 402 where link identification information, such as that established in the process described in relation to the flow chart of FIG. 3, is gathered. From step 402 the process proceeds to step 404, where it is determined whether link identification information for all the links in the network has been gathered and, if not, the process returns to step 402. If link identification information for all the links within the network has been gathered, the process proceeds to step 406, where the network map is updated. This process involves organizing the link identification information gathered in step 402 into coherent map which depicts the point to point connection of each port in each network element within the network. The updating process may involve the revision of an existing map, or may be the initial creation of a network map. A network management system could develop a network map be accessing a single network element and tracing all the links with which that network element is associated to the opposite ends of the links. The links associated with network elements that incorporate these opposite ends may then be traced, and so on, until all links within the network are accounted for and included in the network map.

From step 406 the process proceeds to step 408 where the network map created in step 406, the map which relies upon link identification information obtained according to the process described in relation to the discussion of FIG. 3, is employed to allocate the available network resources for the transmission of information throughout the network. From step 408 the process proceeds to step 410 where the process awaits a link event that would affect the network map or provisioning. Should such an event occur, the process returns to step 402 and from there as previously described. Such link events might include the addition or deletion of a link, the modification of a link identification or an alarm that indicates the failure of a specific link, for example. In this manner, the network may respond to any such link event to identify links, collect link identity information, update the network map and provision network resources accordingly. The process may idle in step 410 awaiting such an event or when the network manager is upgraded, for example, the process may proceed to end in step 412.

Figure 5A:
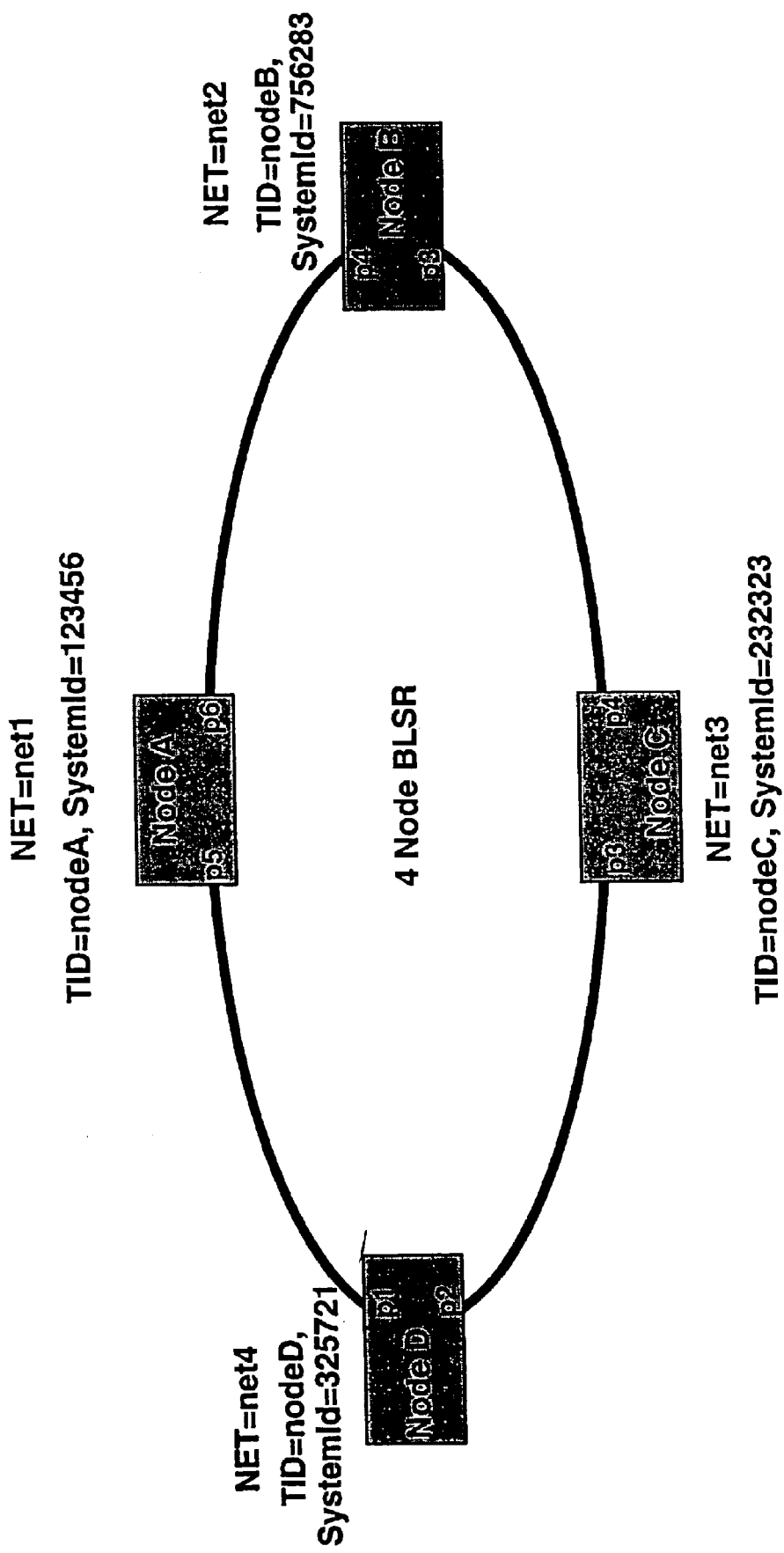
FIGS. 5A through 5C are conceptual block diagrams of a BLSR that illustrate the process of automatic link identification in accordance with the principles of the present invention.
Figure 5B:
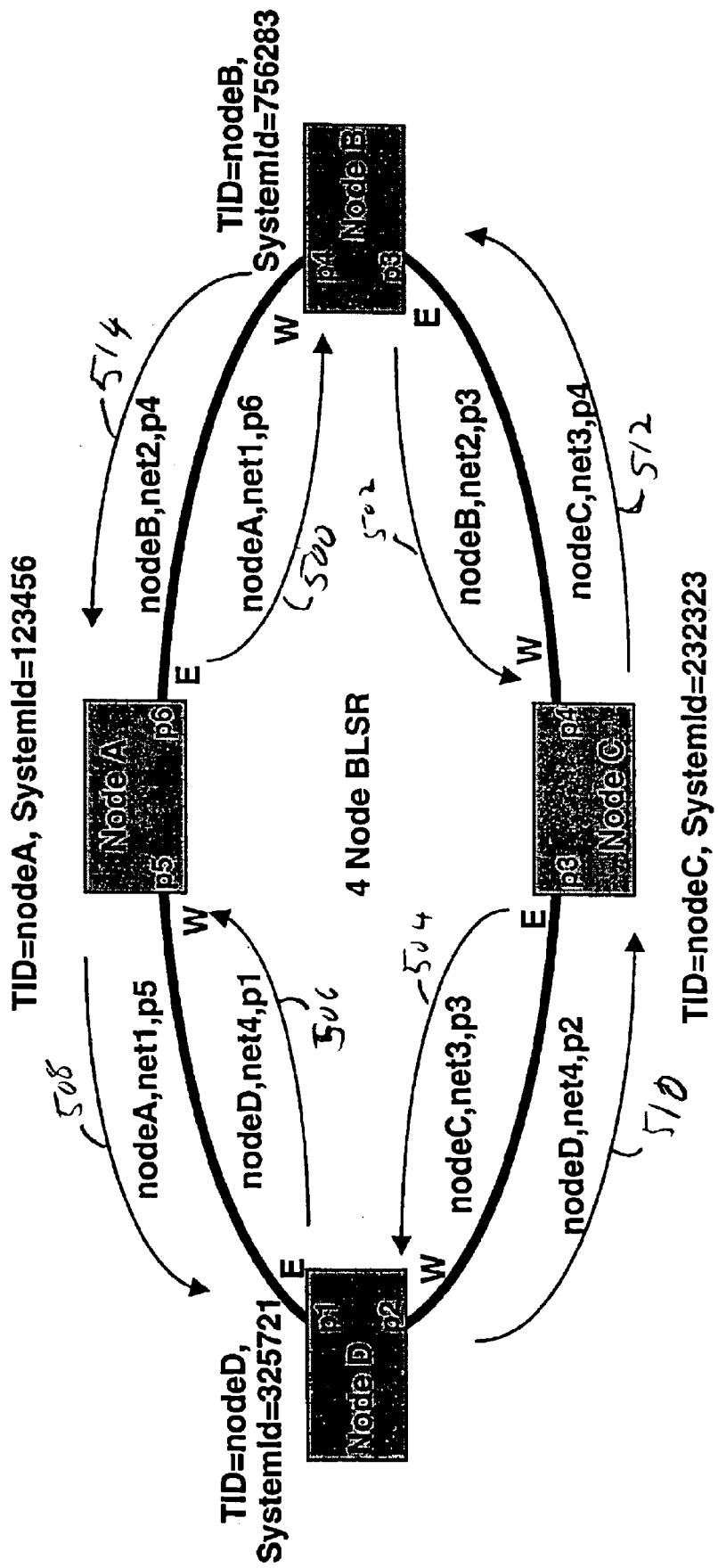
Figure 5C:
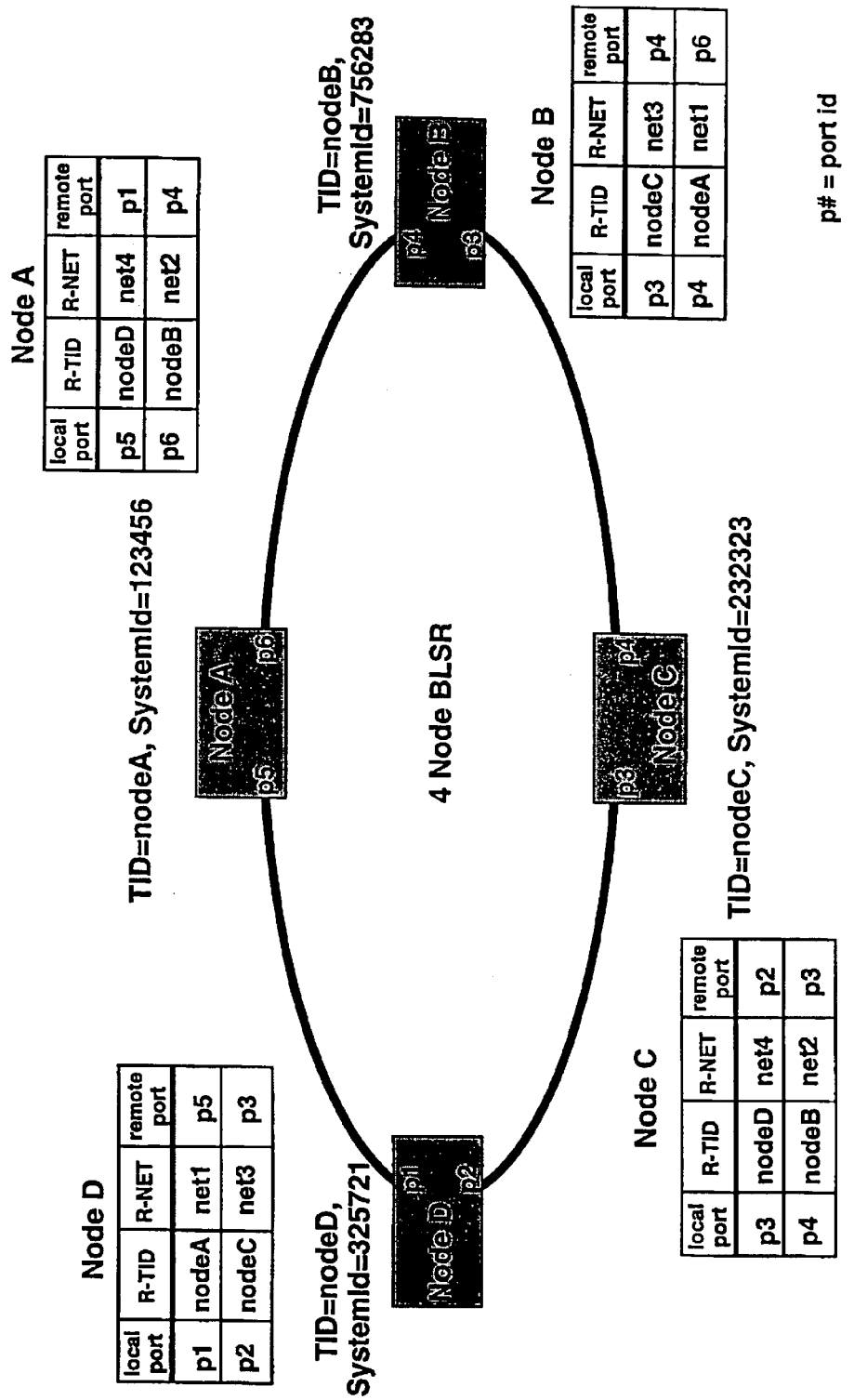

The example of FIGS. 5A through 5C sets forth in greater detail an illustrative embodiment in accordance with the principles of the present invention of a method of producing a network map. A SONET bidirectional line switched ring (BLSR) is used in the example of FIGS. 5A through 5C, but the inventive method is not restricted to SONET or BLSR topologies. The illustrative network mapping is an autonomous topology determination that relies upon information regarding the interconnectivity between adjacent nodes, or network elements, in a telecommunications network. The interconnectivity information, that is, the identification of which port, and, consequently, which node, is connected to each port within a given network element, or node, is supplied as by the apparatus and process described in the discussion related to FIGS. 1 through 4. In addition to the previously described link modification events that may trigger the updating of a network map, a timer may be set so that the network map may be updated at regular intervals.

A BLSR network including four network elements, nodes A, B, C, and D is illustrated in the conceptual block diagram of FIG. 5A. Port p6 of Node A is connected to port p4 of node B, port p3 of node B is connected to port p4 of Node C, port p3 of Node C is connected to port p2 of Node D, and port p1 of Node D is connected to port p5 of Node A. A port ID could be a combination of physical identifiers that correspond to the bay, shelf, slot, and port numbers for a given port. The network address, for example, an OSI network entity title (NET) or TCP/IP address, name (TID) and system identification (Systemid) for each network element is listed next to the respective network element. The Systemid value is actually a component of the network address. The network address, name, and system identification for nodes A–D are, respectively, net1, net2, net3, and net4, node A, node B, node C, and node D, 123456 756283, 232323, and 325721. As the link identification information exchange process begins, each port of each node transmits the above link identification information, as previously described, employing the OSI data link layer and the LAPD protocol in this illustrative embodiment.

This exchange of information is illustrated in greater detail in the conceptual block diagram of FIG. 5B within which the arrows 500, 502, 504, and 506 respectively indicate the transmission of link identification information from node A to node B, node B to node C, node C to node D, and node D to node A. Similarly, arrows 508, 510, 512, and 514 respectively indicate the transmission of link identification information from node A to node D, node D to node C, node C to node B, and node B to node A. Upon completion of this link identification information exchange, each node within the network has acquired the link identity information for each link, including the local and remote port identification, as well as the network address (NET), name (TID) and system identification (Systemid) for each adjacent network element.

The information thus exchanged is summarized in the tables associated with the nodes A–D in the conceptual block diagram of FIG. 5C. For example, the table associated with node A indicates that port p5 (a local port) is connected to remote port p1 associated with a remote network address, NET, of net4 and remote name, TID, of node D. Similarly, local port p6 is connected to a remote port p4 that has a network address, NET, net2 and name, TID, of node B.

Figure 6:
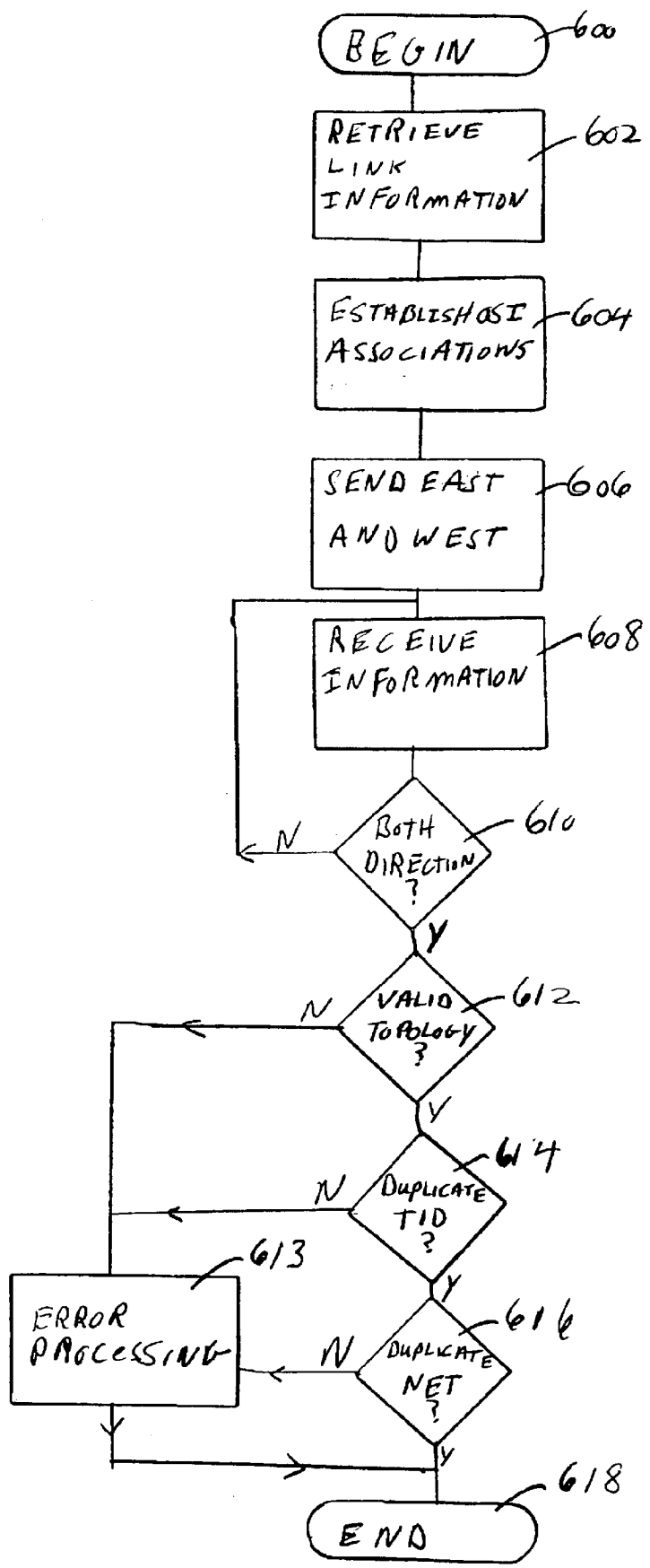
FIG. 6 is a flow chart depicting the use by a node within a network of link identification information to automatically generate a network map.
Figure 7A:
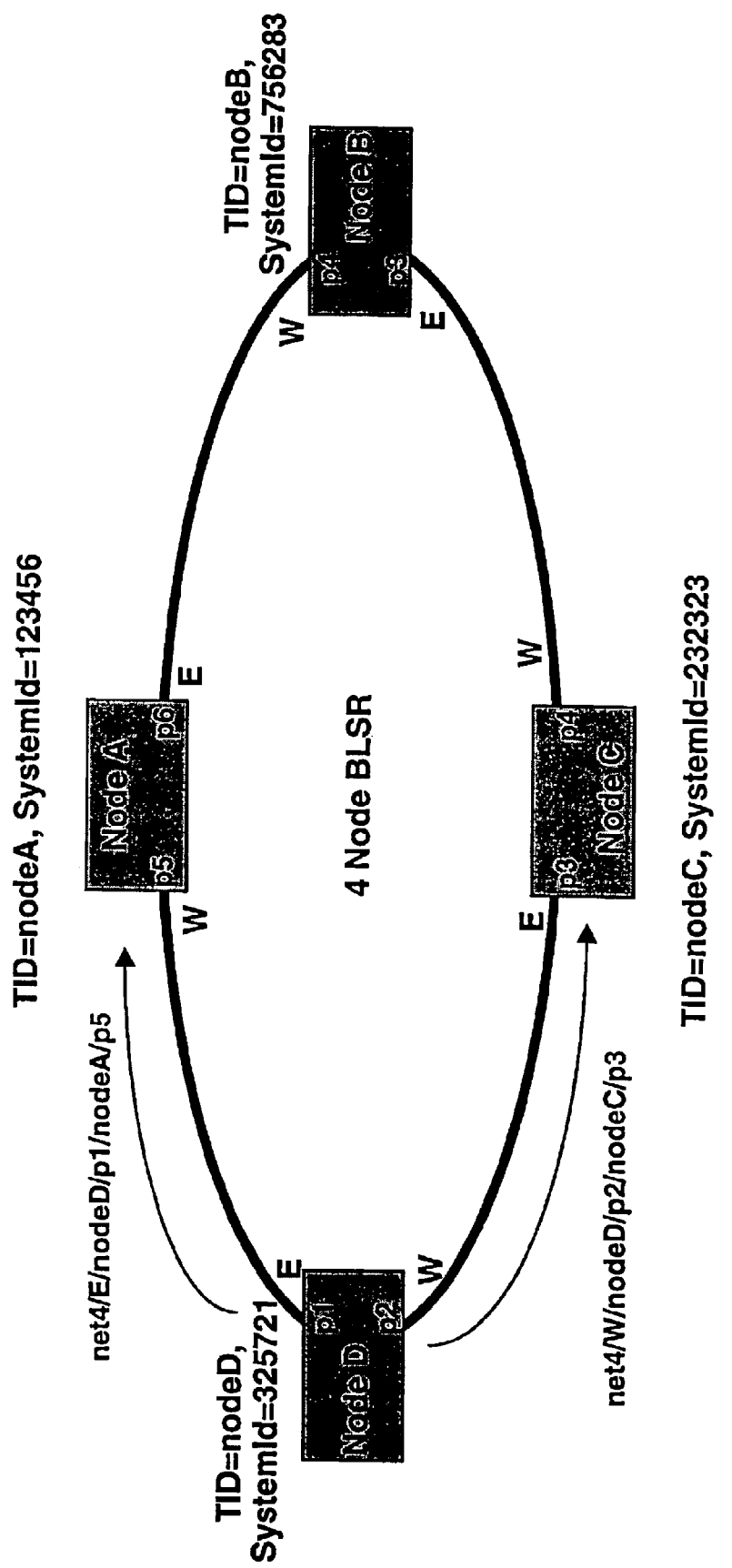
FIGS. 7A through 7D are conceptual block diagrams which depict the operation of automatically determining a network topology by various nodes within a BLSR.
Figure 7B:
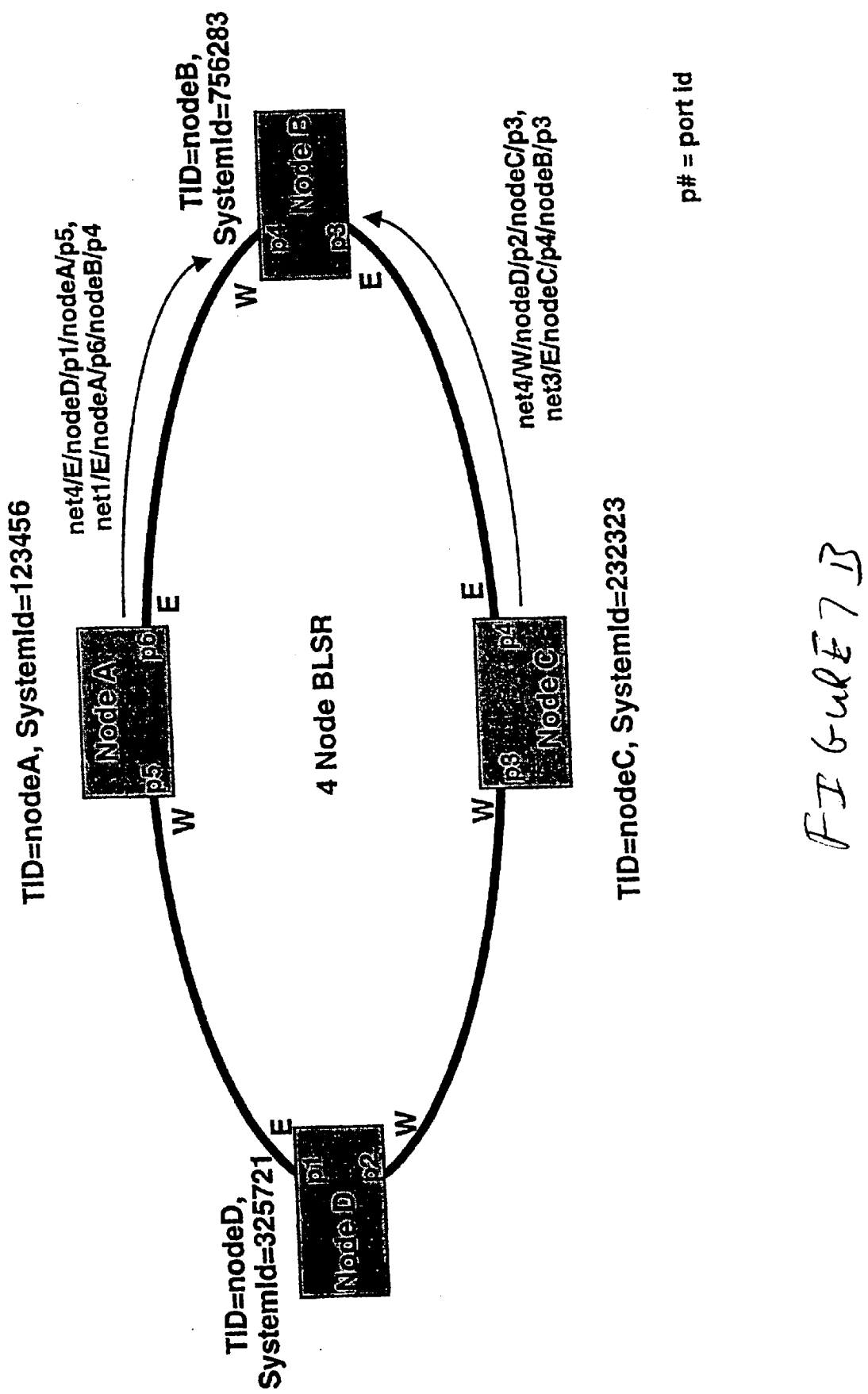
Figure 7C:
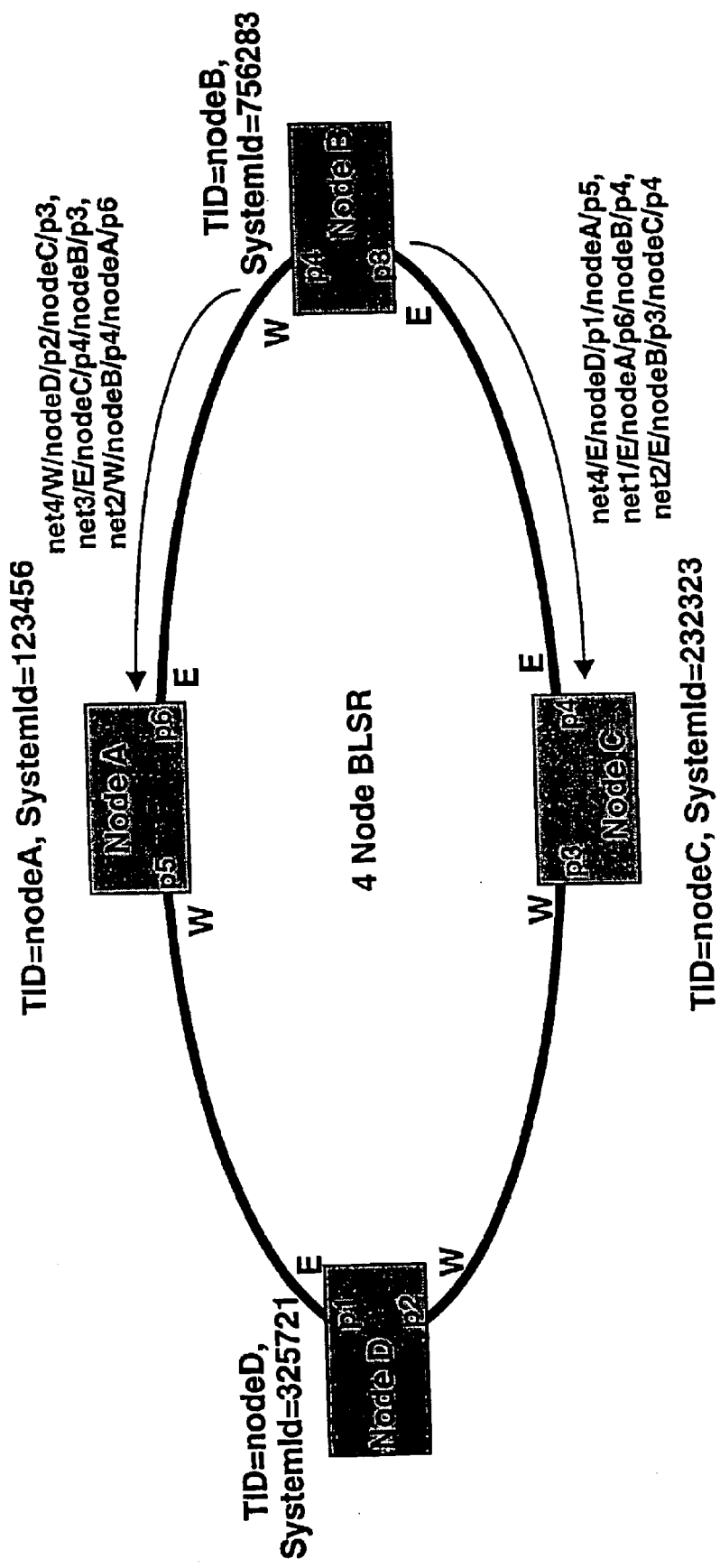
Figure 7D:
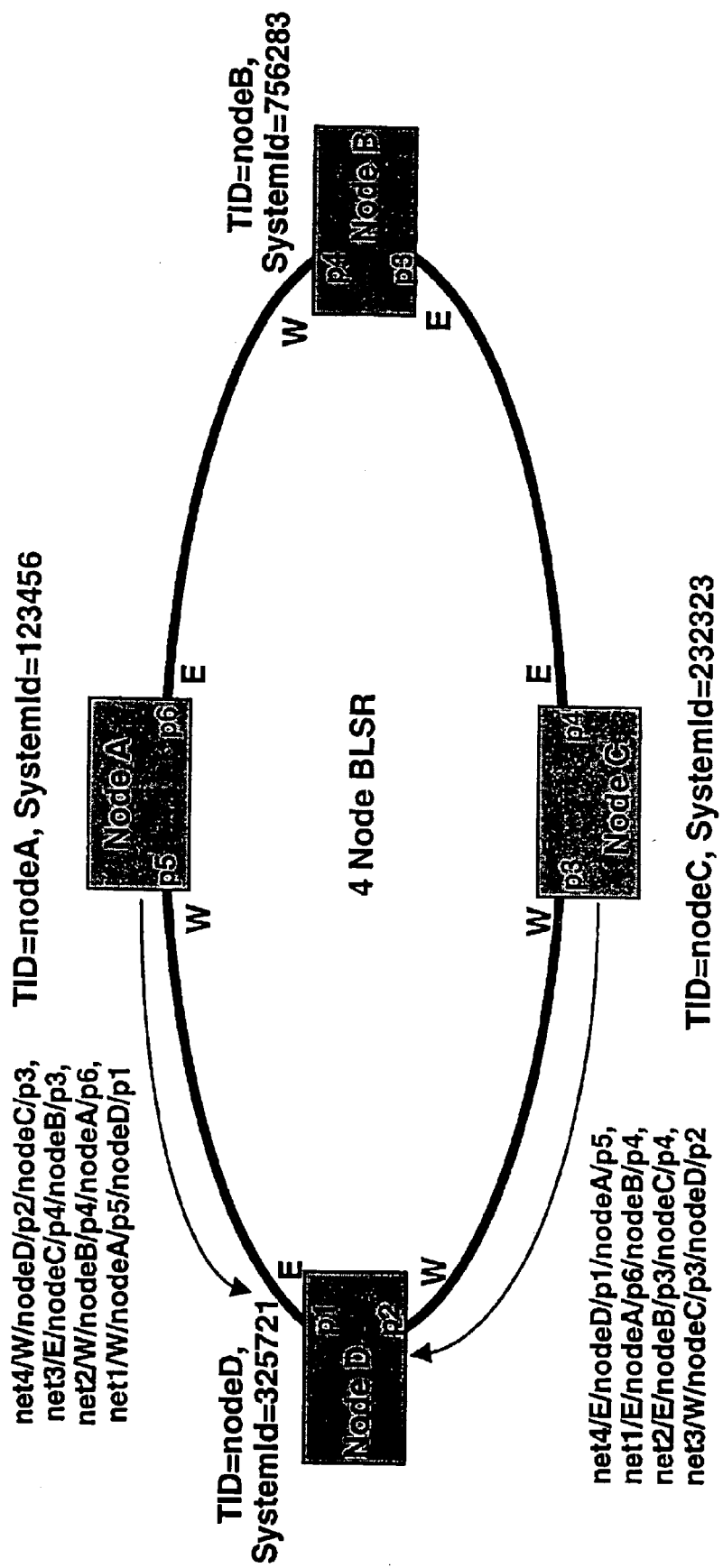

The above link identification information may be employed to determine the network topology, for example, as described in the discussion related to FIGS. 6 through 7D. The illustrative process is decentralized, in that the process is executed independently at each network element, or node. The topology determination process distributes the link identification information, gathered as described in the discussion related to FIGS. 1 through 4, from node to node, each direction around the ring, with each node appending its own link identification information and passing the information along.

The flow chart of FIG. 6 depicts, in general terms, the process each node within the ring undergoes to determine the network topology. The process begins in step 600 and proceeds from there to step 602 where the node retrieves the previously obtained link identification information for each of its associated links. Although the network illustrated in the exemplary embodiments related to FIGS. 5A through 7D have only two links associated with each node, each node may have several links, as in a multiply nested ring. From step 602 the process proceeds to step 604 where the node establishes an OSI association with both its East and West neighbors.

After establishing the OSI associations, the process proceeds to step 606 where the node sends network information, including the local NET, the local East or West label associated with the transmitting port, and the link identification information, to its East and West neighbors. From step 606 the process proceeds to step 608 where the originating node waits to receive network information from the neighbors to which it has sent its own network information. When network information is received from another node the process proceeds to step 610 where the node determines whether it has received appended messages from its East and West neighbors. If it has not received messages from both directions, the process returns to step 608, where the node awaits the receipt of an appended message from the remaining neighbor node. Rather than determining whether it has received messages from both directions, a non-originating node would append its own data to a received message and pass the appended message to the opposite port. That is, if a non-originating node receives a message at its East port, it will add its information to the message, then transmit the message to its western neighbor. If the node (originating) determines in step 610 that it has received messages from both its neighbors, the process proceeds to step 612 where the gathered information is examined to determine the network topology and the resulting topology is examined to determine whether it is a valid topology.

If the topology is not valid, the process proceeds to step 613 for error processing, which may include setting error flags and a renewed attempt at determining the network topology. From step 613 the process proceeds to end in step 618. If, in step 612, it is determined that the network topology is valid, the process proceeds to step 614 where it is determined whether any TIDs (network element names) have been duplicated. If TIDs have been duplicated in the information exchange, the process proceeds to the error processing of step 613, and from there as before. If no TIDs have been duplicated, the process proceeds to step 616 where it is determined whether any NETs (network element addresses) were duplicated in the information exchange. If any NETs have been duplicated, the process proceeds to the error processing of step 613 and from there as previously described. If no duplicate NETs are uncovered, the process proceeds from step 616 to end in step 618.

The conceptual block diagrams of FIGS. 7A through 7D illustrate the process of determining a network topology in an exemplary SONET BLSR network. The process begins in FIG. 7A when node D, after establishing OSI associations with its East and West neighbors, transmits network information, to node A, using the East port of node D, that is port p1 and transmits network information of node C, using the West port of node D, port p2. As noted above, the network information transmitted to nodes A and C includes node D's NET information, an indication of whether the transmitting port is an East or West port, and the link identification information. The information transmitted from Node D to node A, therefore, includes net4/E/nodeD/p1/nodeA/p5, respectively the local NET, the local East or West label of the port, the local TID, local port ID, the remote TID, and the remote port ID. Similarly, the information transmitted from node D to node C includes net4/W/nodeD/p2/nodeC/p3, respectively the local NET, the local East or West label of the port, the local TID, local port ID, the remote TID, and the remote port ID.

FIG. 7B illustrates the further step of the network topology determination whereby the nodes which received network information from node D proceed to append their information and transmitted the concatenated network identification information to the node which lies opposite the port at which they received the network identification information. For example, since Node A has received a message at its west port, port p5, from node D, after appending its own identification information to the message, node A transmits the message from its opposing, East, port to node B. Similarly, since node C has received a message at its west port, port p3, from node D, after appending its own identification information to the message, node C transmits the message from its opposing, East, port to node B.

In FIG. 7C the process proceeds to the point where node B has received messages from both directions, appended its own identification information to those messages, and transmitted the concatenated messages through its opposing ports. For example, the message sent from node B to node C would include the node D port p1 and node A p6 information along with the node B p3 information.

When the originating node, node D, receives return messages from both directions, as depicted in FIG. 7D, node D has a complete ring map of the BLSR, including ring node connectivity at the port interface, as well as the TIDs and NETs of all nodes on the ring. The network map, or topology, thus discovered may be employed to adjust to alarm conditions. For example, should an alarm indicate that the link including port p5 of node A and port p1 of node D has failed, communications may be rerouted between node D and node A by transmission from node A to node B, from node B to node C, and from node C to node D, rather than directly from node A to node D.

The foregoing description of specific embodiments of the invention has been presented for the purposes of illustration and description. It is not intended to be exhaustive or to limit the invention to the precise forms disclosed, and many modifications and variations are possible in light of the above teachings. The embodiments were chosen and described to best explain the principles of the invention and its practical application, and to thereby enable others skilled in the art to best utilize the invention. It is intended that the scope of the invention be limited only by the claims appended hereto.

What is claimed is:

1. A telecommunications network, comprising:
   at least two network devices, each of said network devices comprising at least one network port;
   at least one communications path interconnecting the network ports of each of said at least two network devices, each combination of communications path and interconnected network ports forming a network link; and
   at least one controller in communication with said at least two network devices, said at least one controller configured to perform the steps:
   detecting a network modification within said telecommunications network;
   causing at least one of said network devices to transmit a first port identification message to a successive network device in said communications path, said first port identification message including information regarding at least said at least one originally transmitting network device's perception of the successive network device's network links;
   receiving a second port identification message from said successive network device, said second port identification message including information regarding at least said successive network device's perception of its own network links;

comparing said at least one originally transmitting network device's perception of the successive network device's network links with said successive network device's perception of its own network links; and updating, if said at least one originally transmitting network device's perception of the successive network device's network links does not agree with said successive network device's perception of its own network links, said at least one originally transmitting network device's perception of the successive network device's network links to agree with said successive network device's perception of its own network links.

2. The telecommunications network of claim 1, wherein said at least two network devices comprise network ports.

3. The telecommunications network of claim 2, further comprising at least one network element comprising respective ones of said network ports and said network ports are Synchronous Optical Networking (SONET) ports.

4. The telecommunications network of claim 2, further comprising at least one network element comprising respective ones of said network ports and said network ports are Synchronous Digital Hierarchy (SDH) ports.

5. The telecommunications network of claim 1, wherein said communications path is an optical communications path.

6. The telecommunications network of claim 1, wherein said at least one controller is incorporated within said at least one network device.

7. The telecommunications network of claim 1, wherein at least one controller is incorporated within each of said at least two network devices.

8. The telecommunications network of claim 1, wherein said at least one network device and said successive network device are neighboring devices.

9. The telecommunications network of claim 8, wherein said at least one network device's perception of the network link comprises a device identity of said at least one network device and said successive network device.

10. The telecommunications network of claim 8, wherein said successive network device's perception of the network link comprises a device identity of said successive network device.

11. The telecommunications network of claim 1, wherein said at least one network device is located substantially at a beginning of said communications path and said successive network device is located substantially at an end of said communications path.

12. The telecommunications network of claim 11, wherein said at least one network device's perception of the network link comprises a device identity of said at least one network device, said successive network device and any intermediate devices.

13. The telecommunications network of claim 11, wherein said successive network device's perception of the network link comprises a device identity of said successive network device and any intermediate devices between said at least one network device and said successive network device.

14. The telecommunications network of claim 1, wherein said network modification comprises an addition of a network device to said telecommunications network.

15. The telecommunications network of claim 1, wherein said network modification comprises a reconfiguration of a network link.

16. The telecommunications network of claim 1, wherein said at least one controller is configured to:

cause each of said at least two network devices to transmit a port identification message to a successive device in said communications path, said port identification message including information regarding each of said at least two network device's perception of the network link.

17. The telecommunications network of claim 16, wherein said at least one controller is further configured to develop a network map by accumulating the network link perceptions of each of said at least two network devices.

18. The telecommunications network of claim 17, further comprising a provisioning system configured to allocate telecommunications bandwidth in accordance with said network mapping.

19. The telecommunications network of claim 17 further comprising an alarm processing system responsive to network alarms by re-routing communications through the network, said alarm processing system also responsive to the network link perceptions of each of said at least two network devices.

20. The telecommunications network of claim 1, wherein said telecommunications network is a bi-directional line switched ring and each of said at least two network devices is configured to transmit port identification messages to network devices before and after each of said at least two network devices along said communications path.

21. The telecommunications network of claim 1, wherein said at least one controller is further configured to perform the steps of:

after updating said at least one originally transmitting network device's perception of the successive device's network links, repeating the transmitting, receiving, comparing and updating steps until said at least one originally transmitting network device's perception of the successive device's network links agree with said successive network device's perception of its own network links.

22. The telecommunications network of claim 1, wherein the network links perceived by said at least one originally transmitting network device and said successive network device are network links interconnecting the network ports of said at least one originally transmitting network device and said successive network device.

23. A method for automatic link identification in a telecommunications network comprising at least two network devices, each of said network devices comprising at least one network port, wherein said network ports are interconnected via at least one and a communications path, each combination of communications path and connected network ports forming a network link, comprising:

detecting a network modification within said telecommunications network;

transmitting a first port identification message from at least one of said network devices to a successive network device in said communications path, said first port identification message including information regarding at least said at least one originally transmitting network device's perception of the successive network device's network links;

receiving a second port identification message from said successive network device, said second port identification message including information regarding at least said successive network device's perception of its own network links;

comparing said at least one originally transmitting network device's perception of the successive network device's network links with said successive network device's perception of its own network links; and updating, if said at least one originally transmitting network device's perception of the successive network device's network links does not agree with said successive network device's perception of its own network links, said at least one originally transmitting network device's perception of the successive network device's network links to agree with said successive network device's perception of its own network links.

24. The method of claim 23, wherein each of said at least two network devices is configured to transmit to a successive device in said communications path, a port identification message including information regarding each of said at least two network device's perception of the network link.

25. The method of claim 23, wherein said steps of transmitting and receiving form a logical data link connection between said at least one network device and said successive network device.

26. The method of claim 23, wherein Link Access Protocol-Digital (LAPD) protocol is used for the transmitting of said first and second port identification messages.

27. The method of claim 23, wherein said telecommunications network is a bi-directional line switched ring and each of said at least two network devices is configured to transmit port identification messages to network devices before and after each of said at least two network devices along said communications path.

* * * * *